United States Patent
Bus

(10) Patent No.: US 6,382,266 B1
(45) Date of Patent: May 7, 2002

(54) PIPING SYSTEM FOR CHEMICAL LIQUIDS, IN PARTICULAR OIL PRODUCTS, SUCH AS FUELS

(76) Inventor: Petrus Johannes Bus, Koggewagen 60, 1261 KD Blaricum (NL)

(*) Notice: Subject to any disclaimer, the term of this patent is extended or adjusted under 35 U.S.C. 154(b) by 0 days.

(21) Appl. No.: 09/658,916

(22) Filed: Sep. 11, 2000

(51) Int. Cl.⁷ .................................................. B65B 31/00
(52) U.S. Cl. ............................... 141/59; 141/4; 141/8; 141/65; 141/83; 141/285; 141/290
(58) Field of Search ............................. 141/4, 7, 8, 59, 141/85–88, 65, 67, 83, 95, 285, 290; 138/111–115; 285/397, 398

(56) References Cited

U.S. PATENT DOCUMENTS

| | | | |
|---|---|---|---|
| 4,450,711 A | | 5/1984 | Claude |
| 4,932,257 A | * | 6/1990 | Webb ........................ 73/40.5 R |
| 5,301,721 A | * | 4/1994 | Hartmann ..................... 141/59 |
| 5,407,300 A | * | 4/1995 | Guindon et al. .............. 405/53 |
| 5,529,098 A | * | 6/1996 | Bravo .......................... 141/88 |

FOREIGN PATENT DOCUMENTS

| | | |
|---|---|---|
| DE | 44 34 216 A | 9/1995 |
| EP | 0 753 729 A2 | 1/1997 |

* cited by examiner

*Primary Examiner*—Timothy L. Maust
(74) *Attorney, Agent, or Firm*—Todd Deveau; Troutman Sanders, LLP

(57) ABSTRACT

Piping system for chemical liquids, in particular oil products, such as fuels, at least including a double-walled plastic conveyor pipe (3) with an inlet and an outlet, the double-walled pipe (3) having, in the double wall, one or more intermediate spaces extending along the length of the pipe (3), in which the piping system furthermore includes a gas-conveying system which has a gas-suction device which is connected to the intermediate spaces in such a manner that, in operation, gas can be sucked through the intermediate spaces. A piping system of this nature is suitable in particular for underground use at a petrol station.

10 Claims, 2 Drawing Sheets

PIPING SYSTEM FOR CHEMICAL LIQUIDS, IN PARTICULAR OIL PRODUCTS, SUCH AS FUELS

FIELD OF THE INVENTION

The invention relates firstly to a piping system for chemical liquids, in particular oil products, such as fuels, at least comprising a double-walled plastic conveyor pipe with an inlet and an outlet, the double-walled pipe comprising, in the double wall, one or more intermediate spaces extending along the length of the pipe, and gas-conveying means which are connected to the intermediate spaces for guiding gas through the intermediate spaces.

BACKGROUND OF THE INVENTION

Piping systems of this nature are generally known in the prior art. One example of such system is described in EP-A-0 753 729. This European patent application describes a device for detecting leaks in double-walled pipelines for petrochemical liquids or gases. The double-walled pipelines comprise an inner pipe which conveys the petrochemical liquid or the gas and an outer pipe. Intermediate spaces are present between the inner pipe and the outer pipe. Gas is held at a specified excess pressure in these intermediate spaces. The pressure is continuously monitored in order to detect any leaks. Furthermore, at regular intervals the gas in the outer pipe is circulated past sensors which are able to establish the presence of any evaporated petrochemical liquid or of gas.

In practice, this has proven to be a reliable way of detecting leaks.

However, a further problem is encountered in the technical field of the double-walled plastic conveyor pipes described in the introduction. This problem is that pipes of this nature have proven not to provide a complete seal for many chemical liquids and, in particular various hydrocarbons from fuel. In fact, it has been found that a certain amount of hydrocarbons penetrates through the walls of the pipe to the environment as a result of what is known as "permeation". In a large number of countries, the authorities have stipulated that leakage (permeation) of this nature must be minimized. It is even the case in some countries that no permeation of substances through the walls of the pipe into the soil is permitted at all. However, hitherto no satisfactory solution has been found for controlling the permeation effect.

In EP-A-0 753 729, the intermediate space between the inner and outer pipes is under continuous pressure. This retards the evaporation of any substances which permeate out of the inner pipe.

Moreover, the gas mixture in the intermediate space is stationary for most of the time. As a result, substances which permeate through the inner pipe may build up in the intermediate space. This offers the substances the option of also permeating through the outer pipe to the environment.

However, above all there is a risk that the gas mixture including any permeated substances will be pressed through the outer pipe, for example in the event of a leak in the outer pipe. This runs the risk of the soil and the further environment being seriously contaminated with chemical substances.

SUMMARY OF THE INVENTION

The object of the present invention is to provide a solution to the above problem and, to this end, the invention is characterized in that the gas-conveying means comprise a gas-suction device which is connected to the intermediate spaces in such a manner that, in operation, gas can be sucked through the intermediate spaces.

As a result of gas being discharged, preferably continuously, from the intermediate spaces with the aid of a suction device, any quantity of chemical liquids, such as hydrocarbons, both in gas form and in liquid form which has penetrated through the inner pipe into the intermediate spaces will be discharged. The sucking action of the suction device generates a subatmospheric pressure. Consequently, the chemical substances evaporate more quickly. Moreover, the possibility of gas or liquid being pressed out of the outer pipe is avoided altogether. Consequently, leakage into the soil is completely impossible, and as a result a completely permeation-tight system is obtained.

Chemical liquids mean in particular petroleum products, such as fuels and the like. In the remainder of the application, however, the text will only refer to fuel, although the present invention is, of course, in no way limited to this particular application and is able to counteract the effect of permeation and leakage in any form. The chemical liquids may be all kinds of environmentally hazardous liquids which must not reach the environment.

The gas-suction device may be designed in numerous ways, but preferably comprises a vacuum pump with an explosion-proof electric motor.

All kinds of gases can be sucked through the intermediate spaces in order to remove any fuel which has penetrated into these spaces through permeation or leakage, but preference is given to air. Advantageously, for this purpose the intermediate spaces furthermore are in optionally direct communication with the environment, so that atmospheric air can be sucked through the intermediate spaces.

More advantageously, the intermediate spaces are connected to the gas-suction device at one end and are in optionally direct communication with the environment, for example via a non-return valve, at the other end. This embodiment will be explained in more detail below in the description of the figures.

Piping systems according to the invention can be used for numerous applications. Consideration may be given to supply pipes for storage tanks, discharge pipes from storage tanks to delivery points or installations, conveyor pipes leading to a floating store, pipes for use in the chemical and petrochemical industry and refineries, petrol stations, etc. With regard to its application, the piping system according to the invention is not subject to any particular limitations.

The invention furthermore provides a petrol station at least comprising one or more fuel storage tanks, one or more fuel delivery points, fuel-conveying means and a piping system for connecting the fuel storage tanks to the fuel delivery points, which petrol station is characterized in that it comprises a piping system according to the invention.

The piping system according to the invention is particularly suitable for use in a petrol station, since in such stations very large quantities of fuel are guided through underground piping systems from fuel storage tanks to delivery points. In these stations, there is a constant risk of permeation.

A petrol station is intended to mean a fuel station where, in addition to petrol, it is also possible to fill up with other fuels, such as diesel, LPG, etc.

Petrol stations usually use suction to suck out full vapours formed while filing up, which is usually located in the vicinity of the delivery opening of the filling nozzle. The gas-suction device may be a similar system.

The gas-conveying means according to the invention may also be coupled to a leak detection system. In this case, consideration may be given to certain sensors in the gas outlet from the intermediate spaces in the pipes, in particular the air outlet, so that any fuel leakage can be detected. If appropriate, this leak detection system may be combined with the suction device.

It is also possible to monitor the pressure difference or the flow rate difference between the inlet and the outlet of the intermediate spaces. The difference in flow rate may be monitored at the entry to and exit from the intermediate spaces of each pipeline, but also of the entire system. The current consumption of the suction device may also be monitored. These options may be combined with a liquid separator.

Finally, the invention provides a method for operating a petrol station according to the invention, in which a gas is sucked through the intermediate spaces at least periodically.

Preferably, the amount of gas per pipe is 1–100 L per h, more preferably 2–50 L per h, and most preferably approximately 20 L per h.

The suction may take place either continuously or intermittently. In particular, the gas is sucked through the intermediate spaces intermittently at a frequency which depends on the number of underground pipeline from the tank(s) to the delivery points and on the capacity of the pump. By way of example, the frequency is 1 minute per 10 minutes of suction.

In particular, the gas comprises atmospheric air.

BRIEF DESCRIPTION OF THE DRAWINGS

The invention will be explained in more detail below with reference to the appended drawings, in which.

DETAILED DESCRIPTION OF THE DRAWINGS

Figure 1:
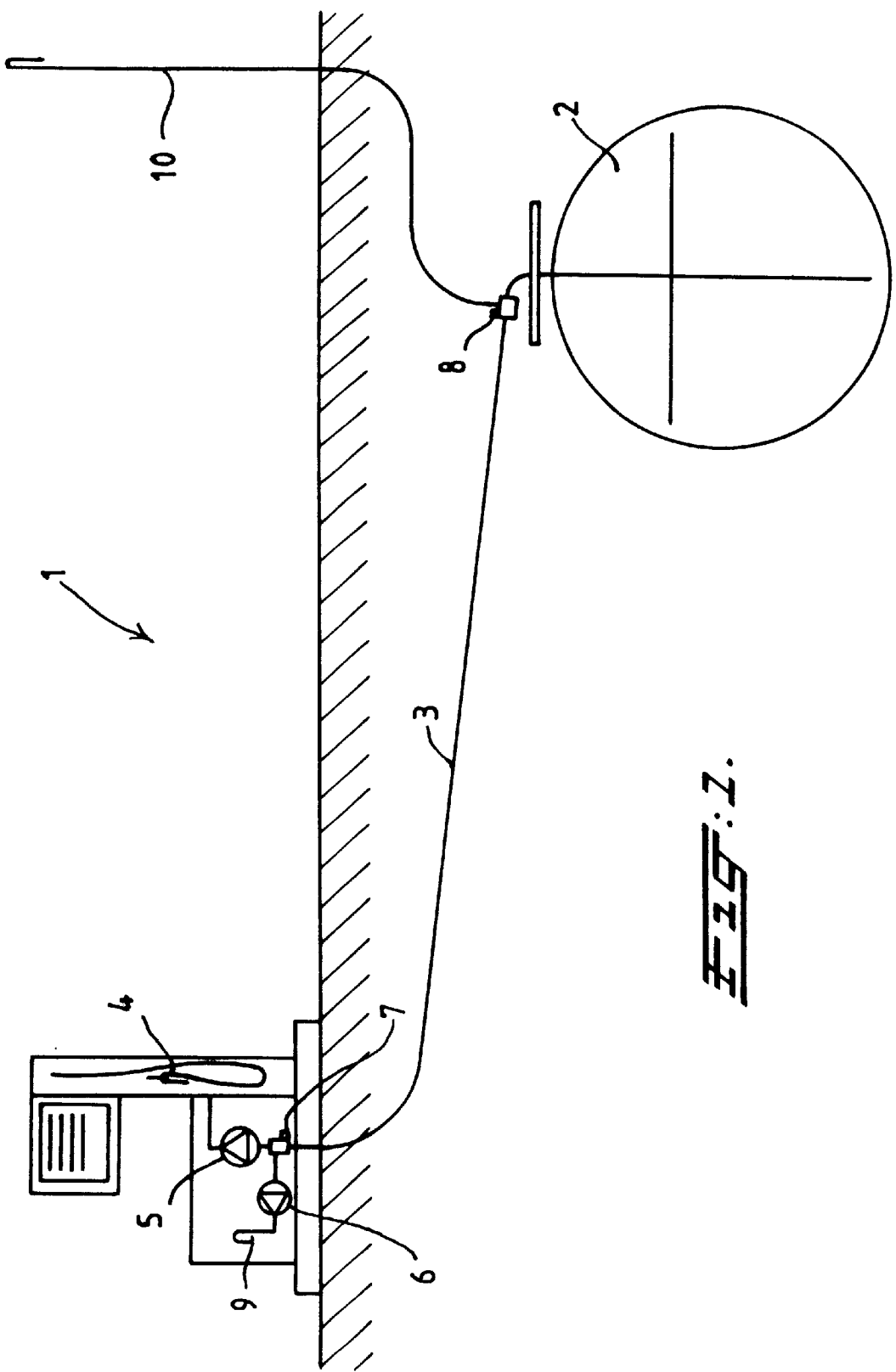
FIG. 1 diagrammatically depicts a petrol station.

In FIG. 1, 1 diagrammatically depicts a petrol station. A petrol station 1 of this nature comprising one or more underground fuel storage tanks 2 and delivery points 4 where vehicles can be filled with fuel with the aid of a fuel nozzle. The delivery points 4 are connected to the fuel tanks 2 by means of a piping system which comprises one or more pipes 3. 5 denotes a fuel pump for pumping fuel up from the storage tank 2 to the delivery point 4. The pipe 3 does not necessarily have to be a single uninterrupted length of pipe, but rather may comprise various pipe sections which are connected to one another by coupling pieces. These coupling pieces may be so-called coaxial coupling pieces or coupling pieces in which the intermediate spaces are connected to one another separately from these coupling pieces.

Figure 2:
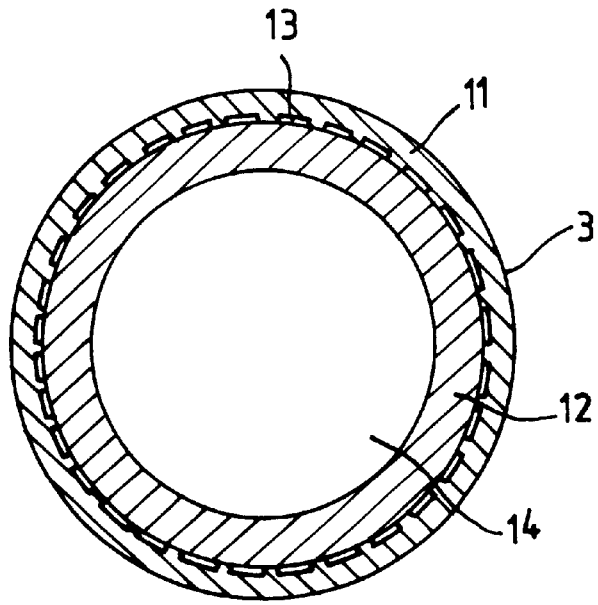
FIG. 2 shows a cross section through a conveyor pipe for use in a piping system according to the invention.

The pipe 3 is a double-walled plastic pipe, as indicated in FIG. 2. The double-walled pipe 3 comprises an outer pipe 11 and an inner pipe 12, which together define intermediate spaces 13 and a passage 14 for fuel. Pipes of this nature may be produced by coextrusion.

The intermediate spaces 13 are connected to an air vacuum pump 6 as a suction device and an air outlet 9 by means of a suitable coupling piece 7. There is also a corresponding coupling piece 8 in the vicinity of the tank, which coupling piece is connected to an air inlet 10. By activating the pump 6, air can be sucked via the inlet 10 through the intermediate spaces 13 to the outlet 9, so that any fuel which permeates or leaks through the inner pipe 12 into the intermediate spaces 13 can be discharged.

By measuring the gas pressure or the gas flow rate through the intermediate spaces 13, it is also possible to carry out leak detection.

Also, using suitable sensors the gas could be analysed in the vicinity of the outlet 9 in order for it to be possible to detect any leakage.

The coupling pieces 7 and 8 used may be coupling pieces as disclosed in WO-A-94/03752.

Figure 3:
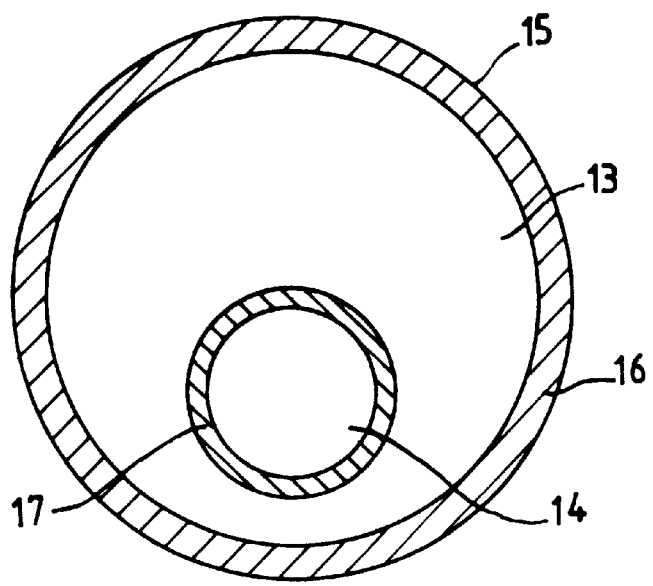
FIG. 3 shows a cross section through another embodiment of a conveyor pipe for use in a piping system according to the invention.

Conveyor pipes which are suitable for a piping system according to the invention are not limited to the pipes as shown in FIG. 2. Other types of double-walled pipes are also possible. In this context, consideration may be given to pipes with more than two walls and, if appropriate, a plurality of intermediate spaces between various walls. FIG. 3 shows a double-walled pipe of the so-called pipe-in-jacket type. This pipe is denoted by 15 and comprises a jacket 16 and an inner pipe 17 with an intermediate space 13 and a passage 14 inside the inner pipe 17. This pipe may also be used appropriately in the example of a petrol station shown in FIG. 1. Pipes of this nature may also be provided with metal reinforcement and/or sealing layers. The pipes may also comprise centering means for centering the inner pipe.

What is claimed is:

1. A permeation tight piping system for volatile liquids comprising:

a conveyor pipe including an inner pipe and an outer pipe which together define an intermediate space extending along the length thereof between said inner pipe and said outer pipe, said inner pipe designed for delivery of volatile liquids; and a gas conveyor connected to said intermediate space for guiding gas through said intermediate space, said gas conveyor being operable independent of the delivery of volatile liquids through said inner pipe.

2. Piping system according to claim 1, wherein the intermediate space furthermore is in optionally direct communication with the environment, so that atmospheric air can be sucked through the intermediate space.

3. Piping system according to claim 2, wherein the conveyor pipe and the intermediate space have a first end and a second end and wherein the intermediate space is connected to the gas conveyor device at said first and is in optionally direct communication with the environment at said second end.

4. A petrol station comprising at least one fuel storage tank, at least one fuel delivery point, fuel-conveying means, and a piping system for connecting the fuel storage tank to the fuel delivery point, wherein the petrol station comprises a piping system according to claim 1.

5. A method for operating a petrol station according to claim 4, wherein the amount of gas removed from said conveyor pipe is in the range of 1–100 liters per hour.

6. A method for operating a petrol station according to claim 4, wherein the amount of gas removed from said conveyor pipe is in the range of 2–50 liters per hour.

7. A method for operating a petrol station according to claim 4, wherein the amount of gas removed from said conveyor pipe is approximately 20 liters per hour.

8. A method according to claim 4, wherein the gas is sucked through the intermediate space intermittently.

9. A method according to claim 4, wherein the gas comprises atmospheric air.

10. A permeation tight piping system for volatile liquids comprising:

a conveyor pipe including an inner pipe and an outer pipe which together define an intermediate space extending along the length thereof between said inner pipe and said outer pipe, said inner pipe designed for delivery of volatile liquids; and a gas conveyor connected to said intermediate space for guiding gas through said intermediate space, said gas conveyor being operable at least periodically to remove gas from said intermediate space and having a fuel vapor outlet for discharging fuel vapor that opens directly or indirectly to the environment.

* * * * *